(12) United States Patent
Campau

(10) Patent No.: US 8,876,450 B1
(45) Date of Patent: *Nov. 4, 2014

(54) LOCKNUT WITH CAGE

(71) Applicant: LockOn LLC, Byron Center, MI (US)

(72) Inventor: Daniel N. Campau, Ada, MI (US)

(73) Assignee: LockOn LLC, Byron Center, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/907,383

(22) Filed: May 31, 2013

(51) Int. Cl.
  *F16B 37/12* (2006.01)
  *F16B 39/12* (2006.01)

(52) U.S. Cl.
  CPC .............. *F16B 39/12* (2013.01); *Y10S 411/9291* (2013.01)
  USPC .......................... 411/251; 411/262; 411/929.1

(58) Field of Classification Search
  USPC ......... 411/204, 246, 248, 250, 251, 262, 929, 411/929.1, 941.1, 946
  See application file for complete search history.

(56) References Cited

U.S. PATENT DOCUMENTS

| 637,360 | A | | 11/1899 | Stark | |
|---|---|---|---|---|---|
| 1,172,722 | A | | 2/1916 | Millard | |
| 1,502,555 | A | * | 7/1924 | Eklund | 411/262 |
| 1,630,958 | A | * | 5/1927 | Mauch | 411/252 |
| 3,589,423 | A | * | 6/1971 | Metz | 411/262 |
| 5,449,259 | A | * | 9/1995 | Clohessey | 411/262 |
| 8,021,093 | B2 | * | 9/2011 | Campau | 411/252 |
| 8,734,072 | B2 | * | 5/2014 | Campau | 411/252 |
| 2011/0176887 | A1 | * | 7/2011 | Im | 411/262 |

OTHER PUBLICATIONS

International Search Report and Written Opinion from PCT/US2014/032441 dated Sep. 15, 2014.

\* cited by examiner

*Primary Examiner* — Roberta Delisle
(74) *Attorney, Agent, or Firm* — Warner Norcross & Judd LLP

(57) ABSTRACT

A locknut includes a body, a locking element, and a cage. The body has a threaded portion and an unthreaded portion. The locking element includes a coil portion having first and second tangs. The locking element is positioned within the cage, and the cage is secured within the unthreaded portion of the body. The cage includes first and second stops, and the first and second tangs of the coil are proximate the stops to be engaged by the stops during rotation of the locknut.

14 Claims, 8 Drawing Sheets

LOCKNUT WITH CAGE

BACKGROUND OF THE INVENTION

The present invention relates to locknuts, and more particularly to locknuts that include a locking coil.

Locknuts can include a locking coil, such as a spring coil or a spring band, as a locking element. In the tightening direction, the nut creates compression on the locking coil, which causes the coil to loosen its grip on the threaded member to permit relative rotation. In the loosening direction, the nut creates tension on the locking coil, which causes the coil to tighten its grip on the threaded member to prevent unintended relative rotation (i.e. loosening).

Locknuts having locking coils are disclosed in U.S. Pat. No. 8,021,093 issued Sep. 20, 2011; U.S. Pat. No. 8,425,168 issued Apr. 23, 2013; and U.S. Pat. No. 8,439,616 issued May 14, 2013, all to Campau, and in U.S. patent application Ser. No. 13/359,942 filed Jan. 27, 2012 by Campau. These locknuts include nut bodies that must be machined, for example to form slots, passages, and notches in the nut body to receive the tangs of the locking coil. Such machining can be difficult, labor-intensive, and expensive.

SUMMARY OF THE INVENTION

The aforementioned problems are overcome in the present invention in which a cage is included in the fastener. The cage reduces the amount of machining required on the fastener body, and thereby reduces the cost of manufacturing the fastener.

As disclosed, the locking fastener includes a fastener body, a locking coil, and a cage. The locking coil is located within the cage, and the cage is secured within the fastener body. The cage includes first and second stops, and the locking coil includes first and second tangs proximate the first and second stops. The tangs are positioned to engage the stops when the nut body is rotated, so that the coil is loosened when the fastener body is turned in a first direction and tightened with the fastener body is turned in a second direction.

These and other advantages and features of the invention will be more fully understood and appreciated by reference to the description of the current embodiments and the drawings.

DESCRIPTION OF THE CURRENT EMBODIMENT

Figure 1:
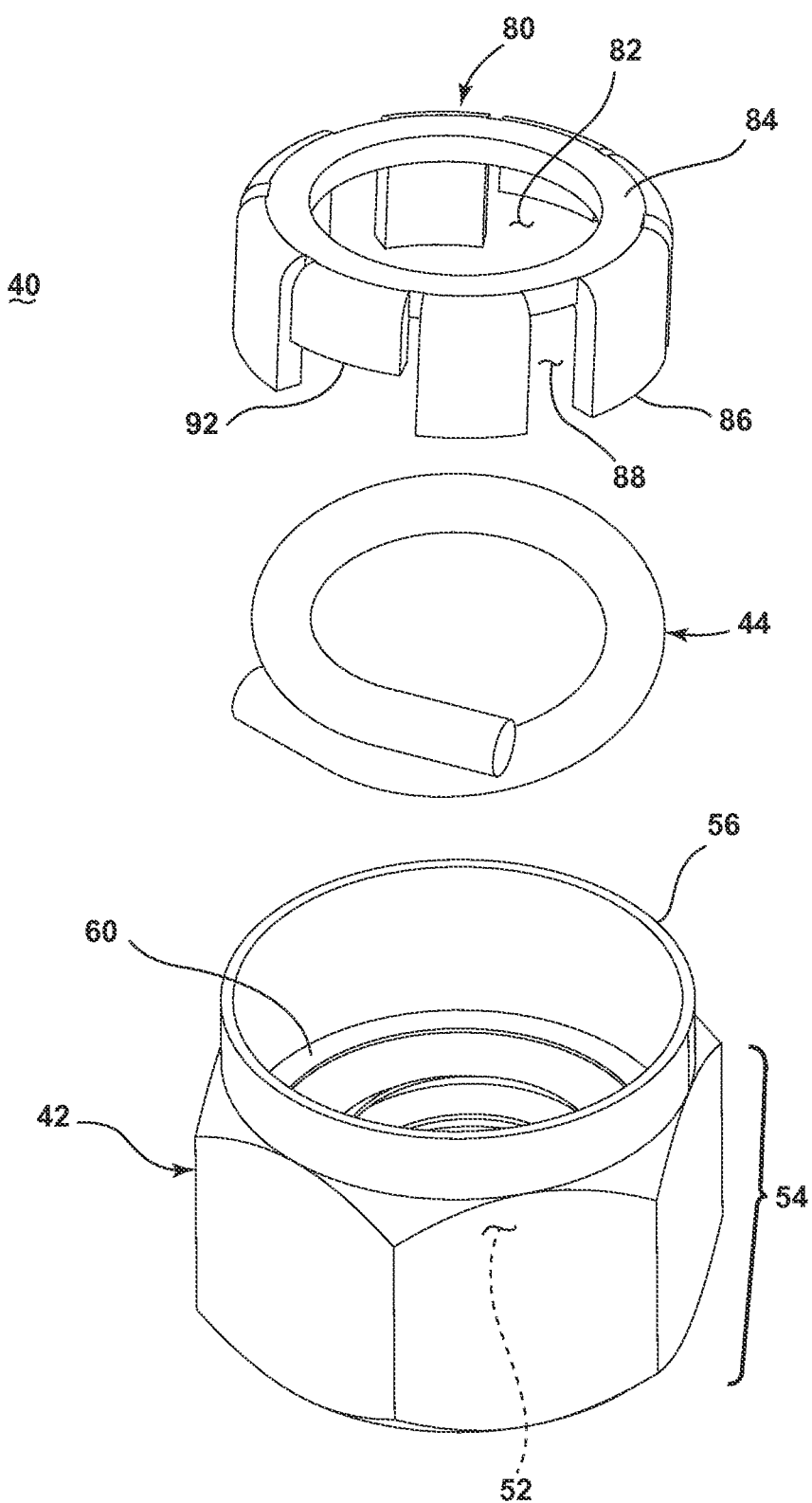
FIG. 1 is a perspective, exploded view of the current embodiment of the locknut.

Before the current embodiment of the invention is described, it is pointed out that the invention is not limited to the details of operation, the details of construction, or the arrangement of the components set forth in the following description or illustrated in the drawings. The invention may be implemented in various other embodiments and may be practiced or carried out in alternative ways not expressly disclosed herein. Also, it is pointed out that the terminology used herein is for the purpose of description and should not be regarded as limiting. The use of "including" and "comprising" and variations thereof encompasses the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

A locknut constructed in accordance with one embodiment of the invention is illustrated in FIGS. 1-8 and generally designated 40. Though shown in FIGS. 1-8 as a retaining nut or a locknut, the concepts of the present invention can be incorporated into a variety of fasteners as will be recognized by those skilled in the art.

The locknut 40 includes a fastener body 42, a locking coil, element, spring, or band 44, and a cage 80. The fastener body 42 includes a hex-shaped outer portion 46 configured to be engaged and driven by a conventional driving tool (not shown). The hex-shaped portion 46 includes a plurality of corners 48 and a plurality of flats 50 extending therebetween. Alternatively, the fastener body 42 may be square, otherwise polygonal, or any other shape. The fastener body 42 may also be shaped to be engaged by any conventional driving tool, now known or later developed.

Figure 2:
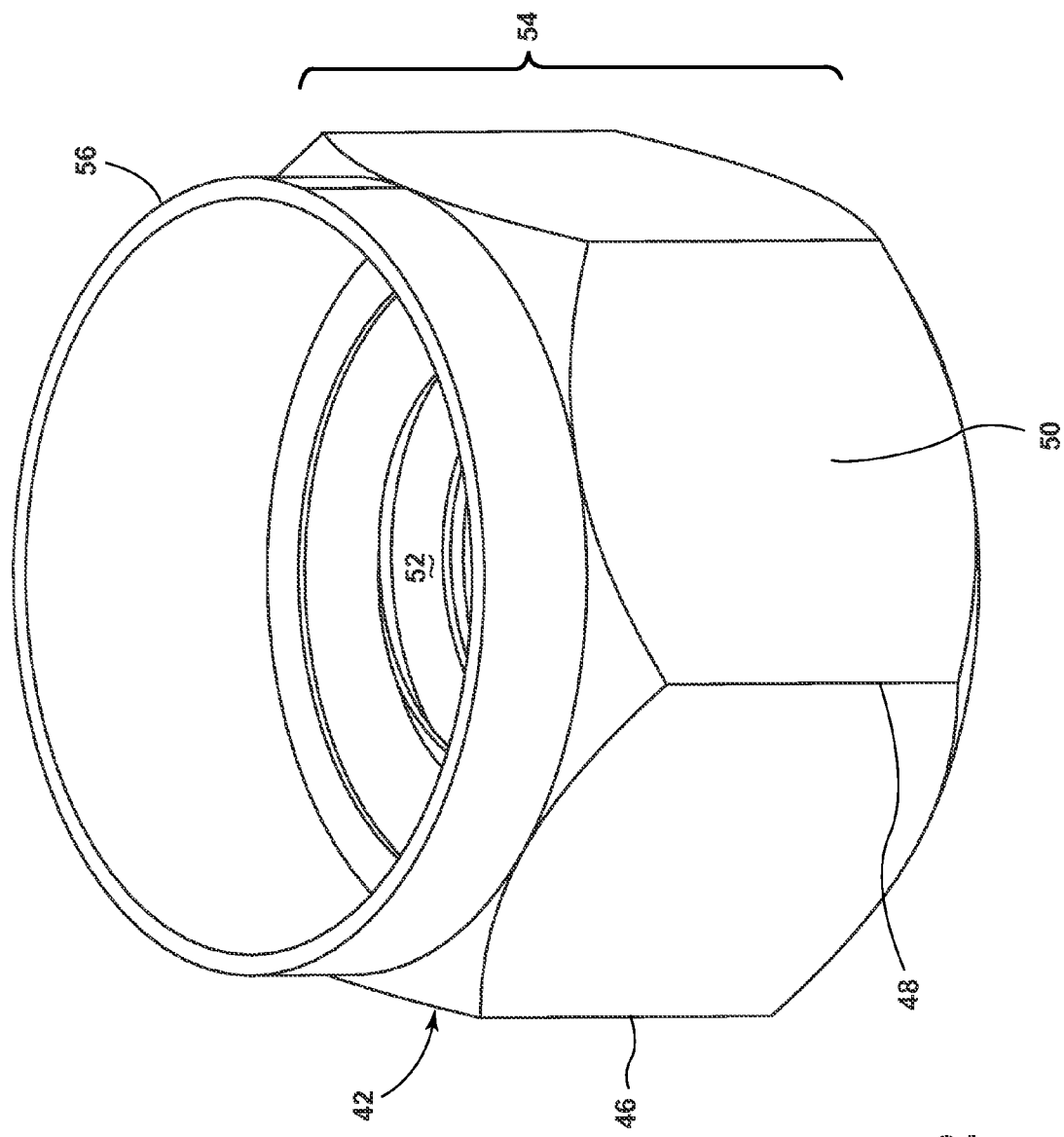
FIG. 2 is a top perspective view of the body of the locknut.

The fastener body 42 defines a bore 52, which is at least partially threaded along its length. As shown in FIG. 2, the bore 52 includes a first portion 54 that is threaded and a second portion, pocket, recess, or counterbore 56 that is unthreaded. The diameter of the unthreaded portion 56 is greater than the diameter of the threaded portion 54 and a shoulder 60 separates the first and second portions 54, 56.

Figure 3:
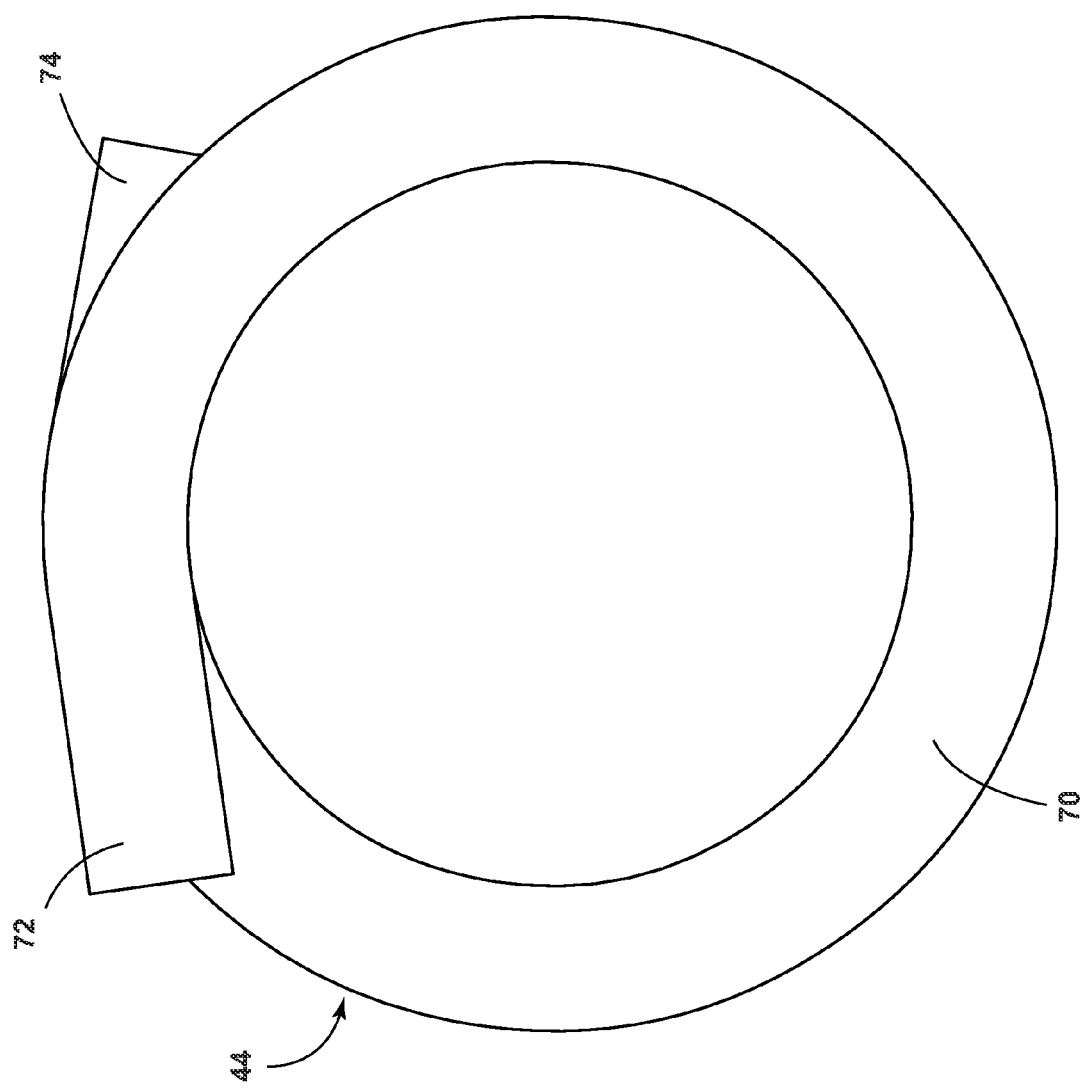
FIG. 3 is top view of the locking band of the locknut.

Referring now to FIG. 3, the locking band 44 includes a coil or continuously curved portion 70 having a circular cross-section extending between a first tang or end portion 72 and a second tang or end portion 74. Though illustrated with a circular cross-section, other cross-sectional shapes are contemplated including square, rectangular, oval, triangular, and any other suitable shape.

In the illustrated example, the first and second tangs or end portions 72, 74 are straight, but other shapes, including smooth curves and angles, are also contemplated. Both tangs 72, 74 extend tangentially outward from the curved portion 70. Also, the locking band 44 may include a single turn, with the first tang 72 overlapping the second tang 74. The locking band 44 may alternatively include less than a single turn, or two or more helical turns so that adjacent turns are substantially in contact with each other. If the locking band 44 includes less than a single turn, the locking band 44 may extend entirely within a single plane oriented perpendicularly to the bore 52, or may extend helically. As shown in FIG. 3, the locking band 44 may be symmetrical to simplify manufacturing.

Figure 4:
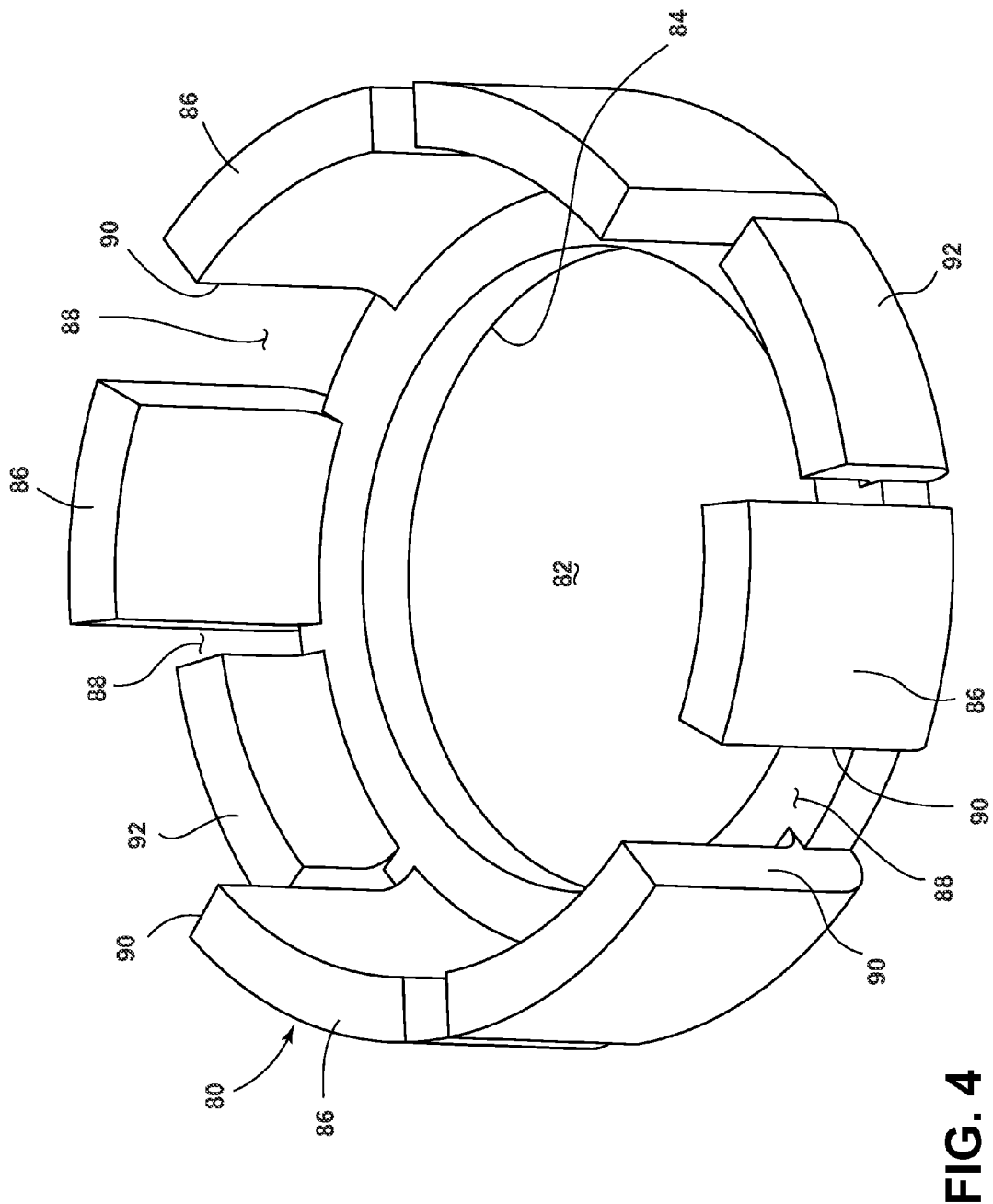
FIG. 4 is a bottom perspective view of the cage of the locknut.
Figure 5:
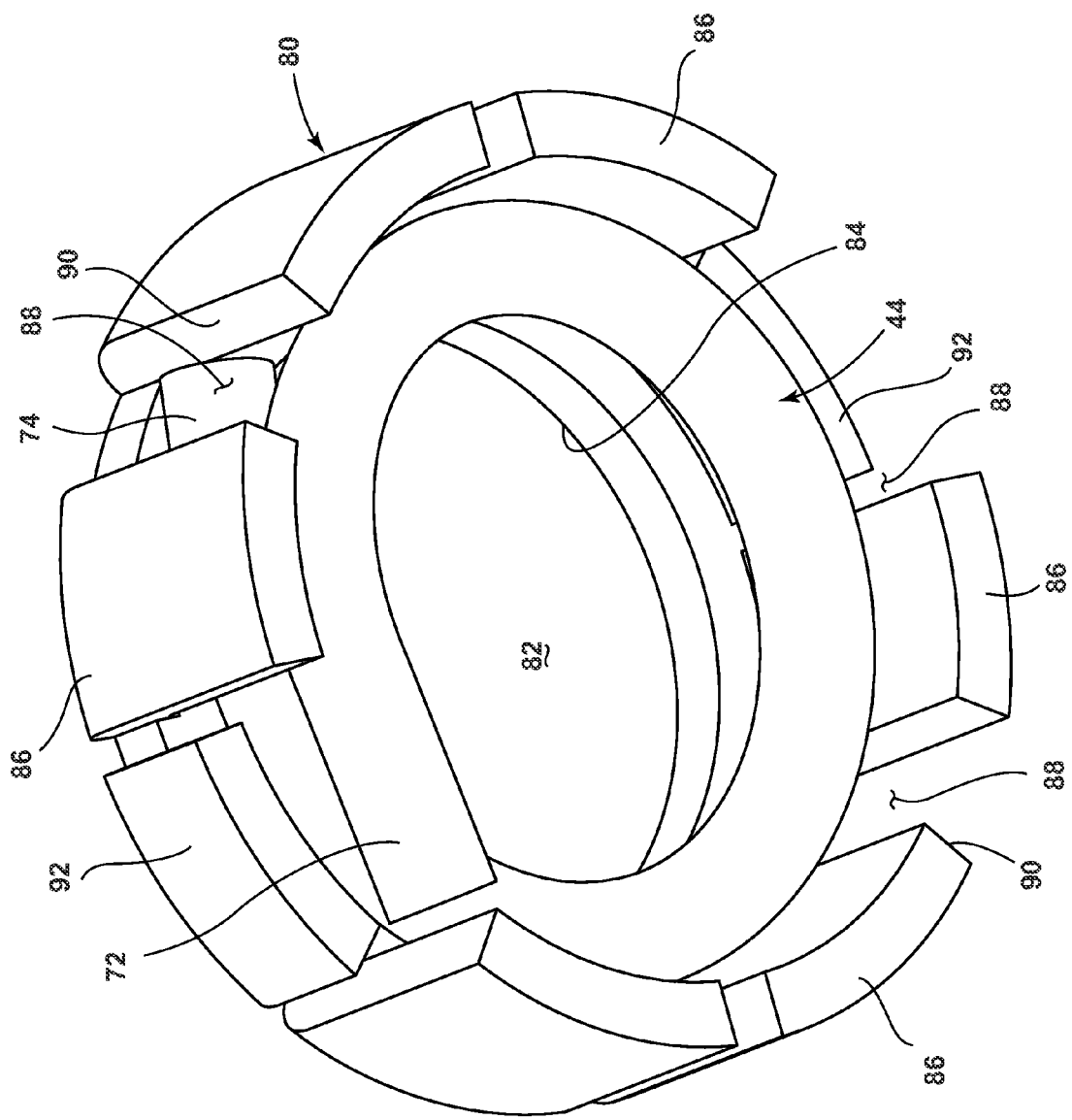
FIG. 5 is a bottom perspective view of the cage and locking band of the locknut.
Figure 6:
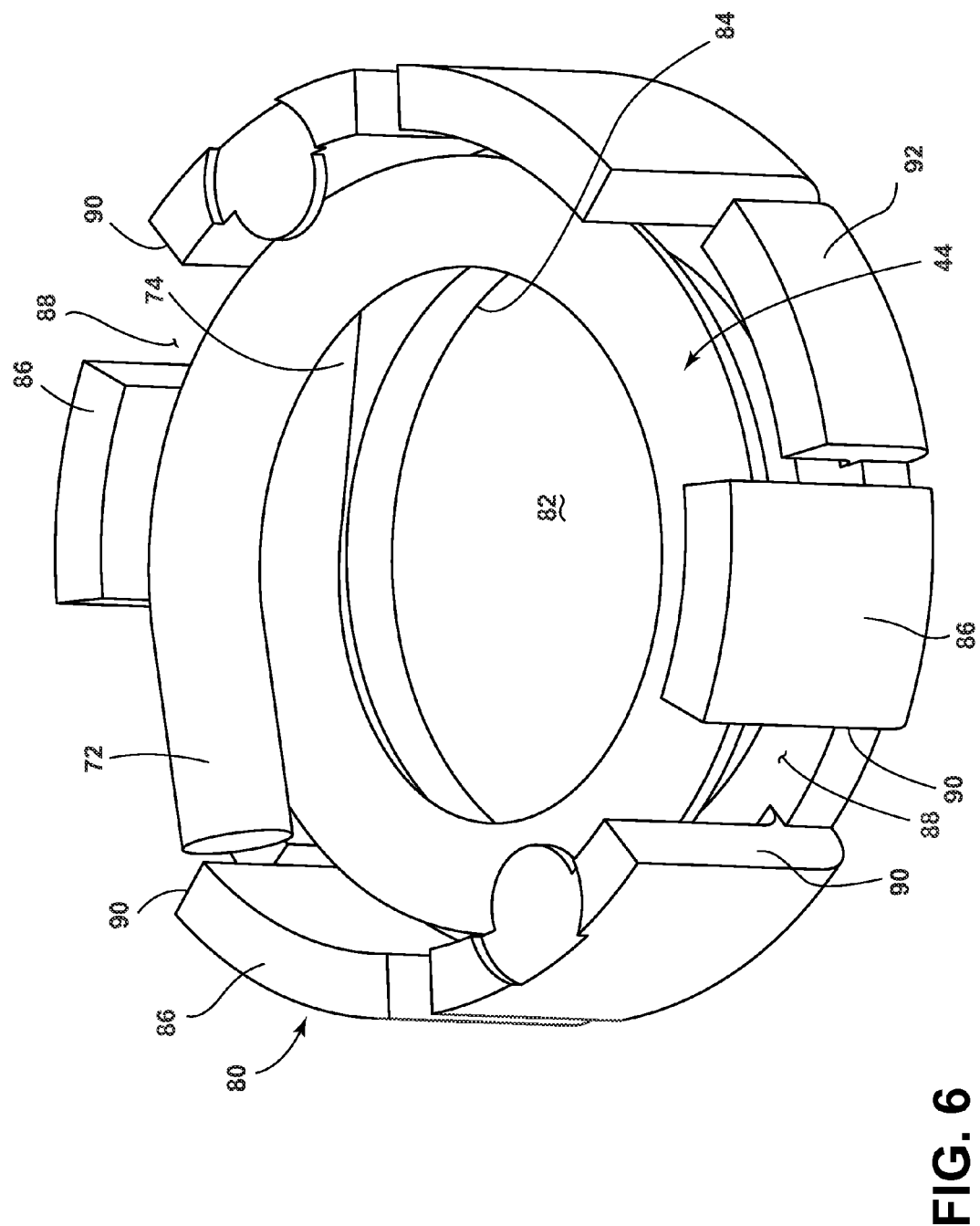
FIG. 6 is a bottom perspective view of the cage and the locking band illustrating the deformation of the lower edge of the cage for capturing the locking band.
Figure 7:
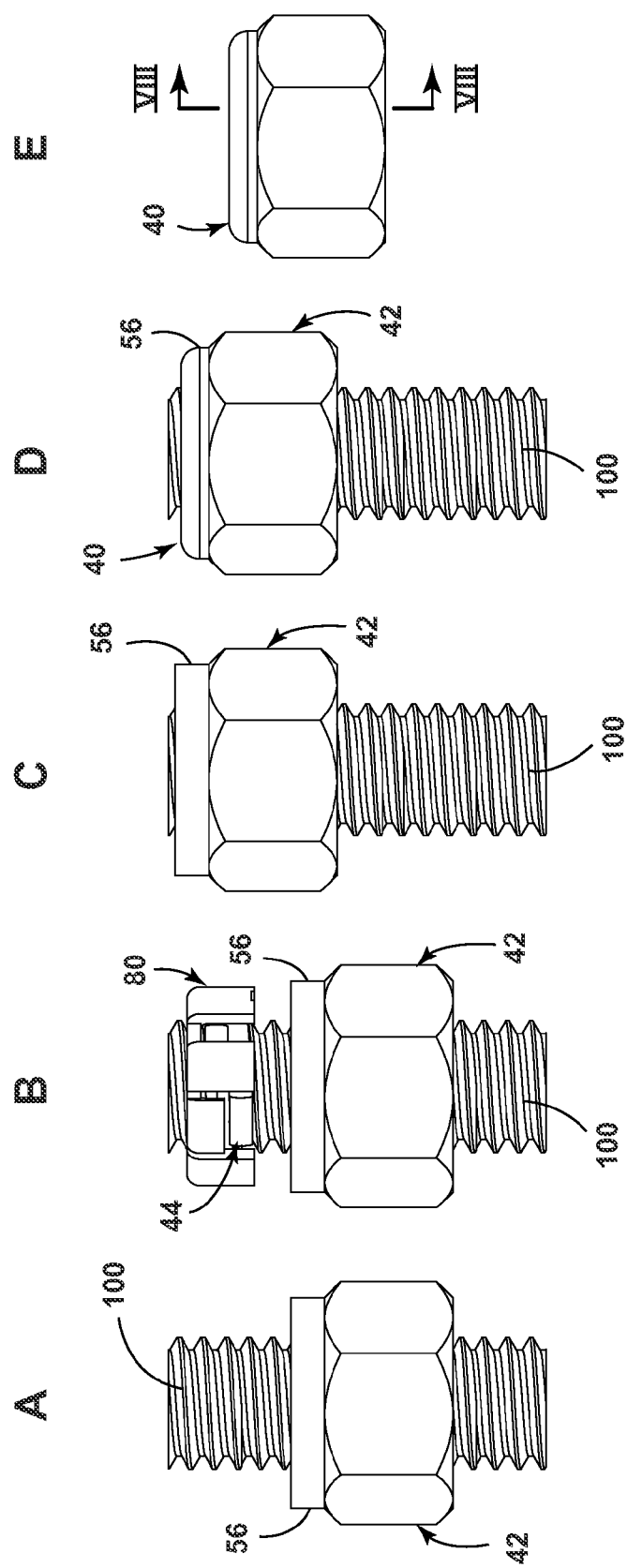
FIG. 7 schematically depicts steps A-E of the assembly of the locknut.

Referring now to FIGS. 4-6, the locknut 40 also includes a spring retainer or cage 80. The cage 80 is a generally cup-shaped element having a rim 84 that defines a central opening 82 in an upper surface of the cage 80. The cage 80 further includes a skirt or circumferential wall. As illustrated, the skirt is formed by a plurality of projections or tabs 86 separated by a plurality of slots, spaces, or openings 88, each tab 86 defining two side edges or stops 90. Further, at least two of the tabs can be truncated tabs 92. The truncated tabs 92 are shorter than the tabs 86.

The cage 80 may be manufactured of a flat metal that is formed in a progressive stamping operation or any other suitable material or forming operation. It should be noted that while the illustrated example shows eight spaces 88 between the tabs 86, 92, more or fewer spaces 88 are contemplated. As will be described hereinafter, some of the spaces 88 are included for reasons of functionality for the locknut 40, while others are included for reasons of manufacturability of the cage 80. Additionally, the cage 80 with its plurality of tabs 86, 92 may be rotationally symmetrical about its central axis to simplify manufacturing and assembly thereof.

The locking band 44 is located within the cage 80 and is oriented such that the tangentially-extending first tang 72 is positioned beneath the truncated tab 92, as shown in the orientation of FIG. 1, and may extend into the space 88. An end of the second tang 74 is positioned within the space 88. As can be seen in FIG. 5, angular movement of the first and second tangs 72, 74 is therefore constrained by the side edges 90 of the adjacent tabs 86, which act as stops. For example, during rotation of the fastener body 42 in an installation or clockwise direction, the end of the second tang 74 may contact side edge 90 of the adjacent tab 86, and in a removal or counterclockwise direction, the end of the first tang 72 may contact side edge 90 of the adjacent tab 86. Accordingly, the angular movement of the first and second tangs 72, 74 is limited relative to the fastener body 42. The curved portion 70 of the locking band 44 rests upon the interior surface of the rim 84. When the locking band 44 is installed in the cage 80, a lower edge of one or more of the tabs 86 may be locally deformed, as illustrated in FIG. 6, to capture the locking band 44 and create a subassembly for subsequent installation in the locknut 40.

Figure 8:
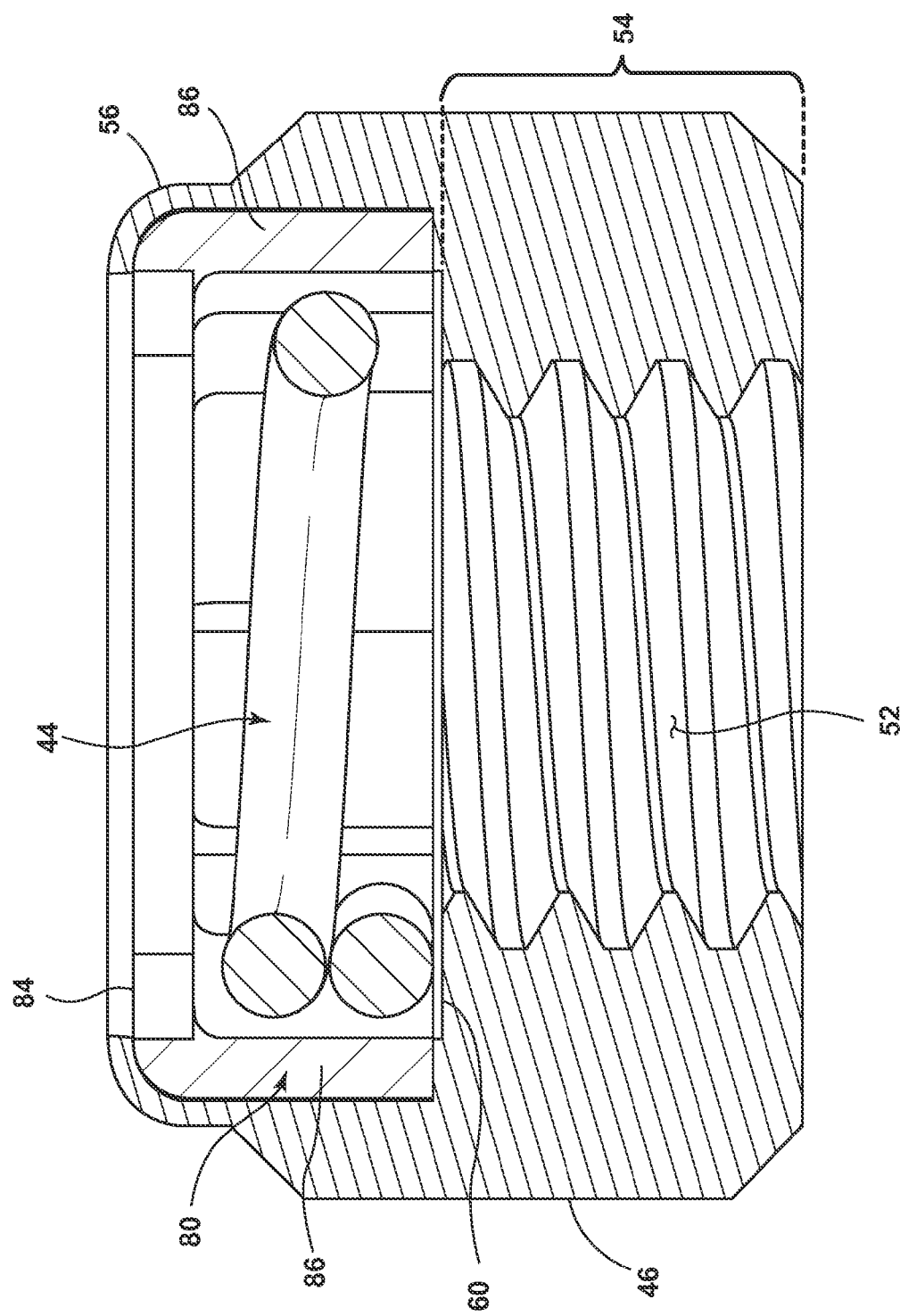
FIG. 8 is a cross-sectional view of the locknut, taken along line VIII-VIII of FIG. 7.

Both the cage 80 and the locking band 44 may be sized to fit the desired fastener body 42 and externally threaded member 45. As can be seen in FIG. 8, the outside diameter of the cage 80 may be selected to closely fit within the internal diameter of the collar 56, and the central opening 82 may be selected to match the inner diameter of the threaded first portion 54 of the fastener body 42. The diameter of the locking band 44 may be sized to fit within the cage 80, but includes sufficient clearance to enable the locking band 44 to expand when the locknut 40 is mounted to the externally threaded member 45. Further, the diameter of the circular cross-section of the locking band 44 generally corresponds to the pitch of the threaded member 45, such that the locking band 44 fits within the threads of the threaded member 45. In a locking band with a non-circular cross-section, the dimension of the surface engaging the threads of the threaded member 45 may be less than, generally the same as, or greater than the pitch of the threaded member.

The fastener body 42, locking band 44, and cage 80 may be manufactured from any suitable materials, including metals and composites. Additionally, the locking band 44 may be manufactured from relatively low-cost materials such as round steel wire.

Referring back now to FIG. 7, the assembly of the locknut 40 will be described in steps A-E. In step A, the fastener body 42 is spun or threaded onto a threaded post 100, leaving a portion of the post 100 extending beyond the fastener body 42. The cage 80 and locking band 44 sub-assembly is threaded, in step B, onto the post 100, above the fastener body 42, and then the fastener body 42 is rotated toward the cage 80 in step C. The cage 80 and locking band 44 sub-assembly remains stationary on the post 100 while the fastener body 42 draws closer, until the shoulder 60 of the fastener body 42 bottoms out on the lower surface of the cage 80 tabs 86. In this position of step C, the cage 80 and locking band 44 sub-assembly and the fastener body 42 are now indexed and aligned.

To retain the cage 80 and locking band 44 sub-assembly within the fastener body 42 and to maintain alignment of the components, the collar 56 of the fastener body 42 may be controllably deformed, as in step D. It is contemplated that manufacturing methods such as swaging, crimping, or orbital forming may be utilized. Of course, any other suitable means for bending the collar 56 over the cage 80 may also be used. Once the collar 56 is deformed, the locknut 40 is complete and may be rotated off the post 100, as in step E.

Installing the fastener body 42, the cage 80, and locking band 44 onto the post 100 aligns the components such that the threads of the fastener body 42 and the helical coil of the locking band 44 are indexed and may be mounted to the externally threaded member 45. For proper performance of the completed locknut 40, the cage 80 and locking band 44 sub-assembly must not rotate relative the fastener body 42. Accordingly, the rim 84 of the cage 80 may include knurling or notches, to enhance engagement with the deformed collar 56.

Installation of the locknut 40 in a first or generally clockwise direction onto the externally threaded member 45 expands the locking band 44, so that the locking band 44 does not interfere with or inhibit movement of the locknut 40 onto the externally threaded member 45. However, rotation of the locknut 40 in a removal or generally counterclockwise direction operates to draw the locking band 44 securely against the threads, whereby the locknut 40 is effectively prevented from undesired, unintentional, or unexpected loosening, for example, due to vibration.

The locking band 44 allows desired loosening of the locknut 40 if sufficient torque is applied to the fastener body 42. When the fastener body 42 is rotated in a second or counterclockwise direction with sufficient torque, the first tang 72 contacts the adjacent side edges 90 of the tabs 86. This contact reduces or potentially eliminates any further increase in stress on the locking element 44 as removal torque is applied to rotate the locknut 40 off the externally threaded member 45. Consequently, there is little or no damage to either the external thread or the locking element 44. When the locknut 40 is fully disengaged with the external thread, the band 44 elastically returns to its original position.

The disclosed locknut 40 provides a lower cost alternative to traditional machined notch locknuts. Each of the presently described fastener body 42, cage 80, and locking band 44 may be produced at relatively high volumes, and at a relatively low cost. Additionally, the configuration of the locknut 40 and its components as described herein enables efficient, high speed, automated assembly. Consequently, the locknut provides an improved balance of simplicity, cost, and performance.

The above description is that of a current embodiment of the invention. Various alterations and changes can be made without departing from the spirit and broader aspects of the invention as defined in the appended claims, which are to be interpreted in accordance with the principles of patent law including the doctrine of equivalents.

This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims.

Directional terms, such as "vertical," "horizontal," "top," "bottom," "upper," "lower," "inner," "inwardly," "outer," "outwardly," "clockwise," and "counterclockwise" are used to assist in describing the invention based on the orientation of the embodiments shown in the illustrations. The use of directional terms should not be interpreted to limit the invention to any specific orientation(s). Any reference to claim elements in the singular, for example, using the articles "a," "an," "the," or "said," is not to be construed as limiting the element to the singular unless expressly stated in the issued claims.

The invention claimed is:

1. A lock nut comprising:
   a nut body having a threaded portion and a counterbore;
   a cage fixed within the counterbore, the cage including a circumferential wall defining first and second stops; and
   a locking coil including first and second tangs, the locking coil disposed within the cage, the first and second tangs being proximate the first and second stops, whereby the first tang engages the first stop when the lock nut is turned in a first direction, and the second tang engages the second stop when the lock nut is turned in a second direction.

2. The lock nut of claim 1 wherein:
   the first and second stops are defined by first and second slots in the circumferential wall; and
   the first and second tangs are located within the first and second slots.

3. The lock nut of claim 1 wherein:
   the nut body includes a shoulder and an opposite swaged portion; and
   the cage is fixed between the shoulder and the swaged portion.

4. The lock nut of claim 1 wherein the pitch of the locking coil corresponds to the pitch of the threaded portion of the nut body.

5. A locking fastener comprising:
   a fastener body having a threaded portion and an unthreaded portion;
   a locking element including a coil portion and first and second tangs extending from the coil portion; and
   a cage including a plurality of tabs separated by a plurality of spaces, the locking element located within the cage, and the cage and locking element being retained within the unthreaded portion.

6. The locking fastener of claim 5 wherein the first and second tangs extend generally tangentially from the coil portion.

7. The locking fastener of claim 5 wherein one of the first and second tangs is configured to contact a side edge of one of the plurality of tabs during loosening of the locking fastener and the other of the first and second tangs is configured to contact a side edge of another of the plurality of tabs during tightening of the locking fastener.

8. The locking fastener of claim 5 wherein the fastener body is deformed so as to retain the cage and locking element within the fastener body.

9. The locking fastener of claim 5 wherein the cage defines a central aperture having a diameter corresponding to the diameter of a threaded member on which the locking fastener may be mounted.

10. A locking fastener comprising:
    a fastener body having a threaded portion and an unthreaded portion;
    a locking band including a coil portion and first and second tangs extending from the coil portion; and
    a cage including a plurality of tabs separated by a plurality of spaces, the locking band being disposed within the cage and oriented such that an end of the first tang is positioned in one of the plurality of spaces, and an end of the second tang is positioned in another of the plurality of spaces, the first tang is configured to contact the side edge of one of the plurality of tabs during removal of the locking fastener and the second tang is configured to contact the side edge of another of the plurality of tabs during installation of the locking fastener, the cage and locking band being retained within the unthreaded portion.

11. The locking fastener of claim 10 wherein:
    the threaded portion and the unthreaded portion are separated by a shoulder;
    one of the tabs is a truncated tab; and
    the first tang is between the truncated tab and the shoulder.

12. The locking fastener of claim 10 wherein the cage and locking band are threadedly aligned and indexed with the threaded portion of the fastener body.

13. The locking fastener of claim 10 wherein a portion of the fastener body is deformed to retain the cage and locking band within the fastener body.

14. The locking fastener of claim 10 wherein the cage defines a central aperture having a diameter corresponding to the diameter of a threaded member on which the locking fastener may be mounted.

* * * * *